US010569799B2

(12) United States Patent
Kim et al.

(10) Patent No.: US 10,569,799 B2
(45) Date of Patent: Feb. 25, 2020

(54) AUTOMATICALLY RETRACTING AND EXTENDING A VEHICLE STEERING WHEEL

(71) Applicant: Faraday & Future Inc., Gardena, CA (US)

(72) Inventors: Richard S. Kim, Los Angeles, CA (US); Charles LeFranc, Topanga, CA (US); Kenneth X. Xie, Manhattan Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/487,315

(22) Filed: Apr. 13, 2017

(65) Prior Publication Data

US 2017/0297606 A1    Oct. 19, 2017

Related U.S. Application Data

(60) Provisional application No. 62/321,997, filed on Apr. 13, 2016.

(51) Int. Cl.
  *B62D 1/183*    (2006.01)
  *B62D 1/181*    (2006.01)
  *B62D 1/185*    (2006.01)

(52) U.S. Cl.
  CPC ............ *B62D 1/183* (2013.01); *B62D 1/181* (2013.01); *B62D 1/185* (2013.01)

(58) Field of Classification Search
  CPC .. B62D 1/183; B60R 25/0222; B60R 25/0224
  See application file for complete search history.

(56) References Cited

U.S. PATENT DOCUMENTS

| 1,847,209 A * | 3/1932 | Bolinas, Jr. ......... B60R 25/0224 74/555 |
| 7,610,830 B2 * | 11/2009 | Serrano Gil .......... B63H 25/02 114/160 |

(Continued)

FOREIGN PATENT DOCUMENTS

FR    2779695 A1 * 12/1999    ............. B60K 35/00

OTHER PUBLICATIONS

Belanger Pascal Bertrand, Adjustable steering column with integrated and retractable microcomputer mounted underneath, Dec. 17, 1997, FR 2 779 695 A1, English Abstract (Year: 1999).*

(Continued)

*Primary Examiner* — James A English
(74) *Attorney, Agent, or Firm* — Veros Legal Solutions, LLP

(57) ABSTRACT

A system for automatically adjusting a steering wheel of a vehicle may include a controller configured to generate a control signal for retracting a steering wheel to a collapsed position. The steering wheel may include a first half and a second half, and the system may include an actuator configured to collapse the steering wheel in response to the control signal. The actuator may be configured to fold the first and second halves of the steering wheel in a direction orthogonal to a direction of a longitudinal axis defined by a steering column, and retract the steering wheel along the direction of the longitudinal axis, towards a dashboard.

20 Claims, 7 Drawing Sheets

(56) References Cited

U.S. PATENT DOCUMENTS

| | | | | |
|---|---|---|---|---|
| 2016/0200344 A1* | 7/2016 | Sugioka | ............... | B62D 1/183 |
| | | | | 74/493 |
| 2016/0347348 A1* | 12/2016 | Lubischer | ............. | B62D 1/181 |
| 2016/0375926 A1* | 12/2016 | Lubischer | ............. | B62D 1/183 |
| | | | | 74/493 |
| 2016/0375927 A1* | 12/2016 | Schulz | ................. | B62D 1/183 |
| | | | | 280/775 |
| 2016/0375931 A1* | 12/2016 | Lubischer | ............. | B62D 1/183 |
| | | | | 701/23 |
| 2017/0113589 A1* | 4/2017 | Riefe | .................... | B60N 3/005 |
| 2017/0297606 A1* | 10/2017 | Kim | ...................... | B62D 1/181 |
| 2018/0029501 A1* | 2/2018 | Wolf | ....................... | B60N 2/06 |

OTHER PUBLICATIONS

Belanger Pascal Bertrand, Adjustable steering column with integrated and retractable microcomputer mounted underneath, Dec. 17, 1997, FR 2 779 695 A1, Machine Translation of Description (Year: 1999).*

* cited by examiner

# AUTOMATICALLY RETRACTING AND EXTENDING A VEHICLE STEERING WHEEL

CROSS-REFERENCE TO RELATED APPLICATIONS

This application claims the benefit of U.S. Provisional Application No. 62/321,997, filed Apr. 13, 2016, the entirety of which is hereby incorporated by reference.

TECHNICAL FIELD

The present disclosure generally relates to systems and methods for adjusting steering wheels in a vehicle, and more specifically, to systems and methods for automatically retracting and extending automobile steering wheels.

BACKGROUND

A vehicle is normally equipped with a steering wheel. The steering wheel typically protrudes outward from an instrument panel to enable a driver to operate a car.

Although a steering wheel may be used to navigate a vehicle, there are some shortcomings. For example, a steering wheel occupies significant space next to a driver's seat, increasing the difficulty for a driver entering and exiting through the driver's side door of the vehicle, especially where a driver's seat is immovable. Furthermore, the space occupied by a steering wheel is often unavailable for use when a vehicle is parked and/or a driver is not required to operate a steering wheel.

Therefore, there is a need for collapsible vehicular steering wheels to provide additional space for a vehicle operator when retracted. However, some existing collapsible steering wheels are generally manual, requiring significant operator effort to both retract and extend the steering wheel. Moreover, when collapsed, such steering wheels do not generally provide sufficient space to accommodate an airbag. An airbag is required to comply with contemporary vehicle regulations, and is a necessary safety measure to preserve a driver's well-being during an automobile accident. Therefore, it may be desirable to implement a steering wheel that is both automatically collapsible and offers space to accommodate an airbag.

SUMMARY

One aspect of the present disclosure is directed to a system for automatically adjusting a steering wheel of a vehicle. The system may include a controller configured to generate a control signal for retracting a steering wheel to a collapsed position. The steering wheel may include a first half and a second half, and the system may include an actuator configured to collapse the steering wheel in response to the control signal. The actuator may be configured to fold the first and second halves of the steering wheel in a direction orthogonal to a direction of a longitudinal axis defined by a steering column, and retract the steering wheel along the direction of the longitudinal axis, towards a dashboard.

One aspect of the present disclosure is directed to a vehicle. The vehicle may include a steering wheel including a first half and a second half, and a controller configured to generate a control signal for retracting the steering wheel to a collapsed position. The vehicle may include an actuator configured to collapse the steering wheel in response to the control signal. The actuator may be configured to fold the first and second halves of the steering wheel in a direction orthogonal to a direction of a longitudinal axis defined by a steering column, and retract the steering wheel along the direction of the longitudinal axis, towards a dashboard.

Yet another aspect of the present disclosure is directed to a method for automatically adjusting a steering wheel of a vehicle. The method may include generating, by at least one controller, a control signal for retracting the steering wheel to a collapsed position, and the steering wheel may include a first half and a second half. The method may include collapsing, by at least one actuator, the steering wheel in response to the control signal. Collapsing the steering wheel may include folding the first and second halves of the steering wheel in a direction orthogonal to a direction of a longitudinal axis defined by a steering column, and retracting the steering wheel along the direction of the longitudinal axis, towards a dashboard.

DETAILED DESCRIPTION

Figure 1:
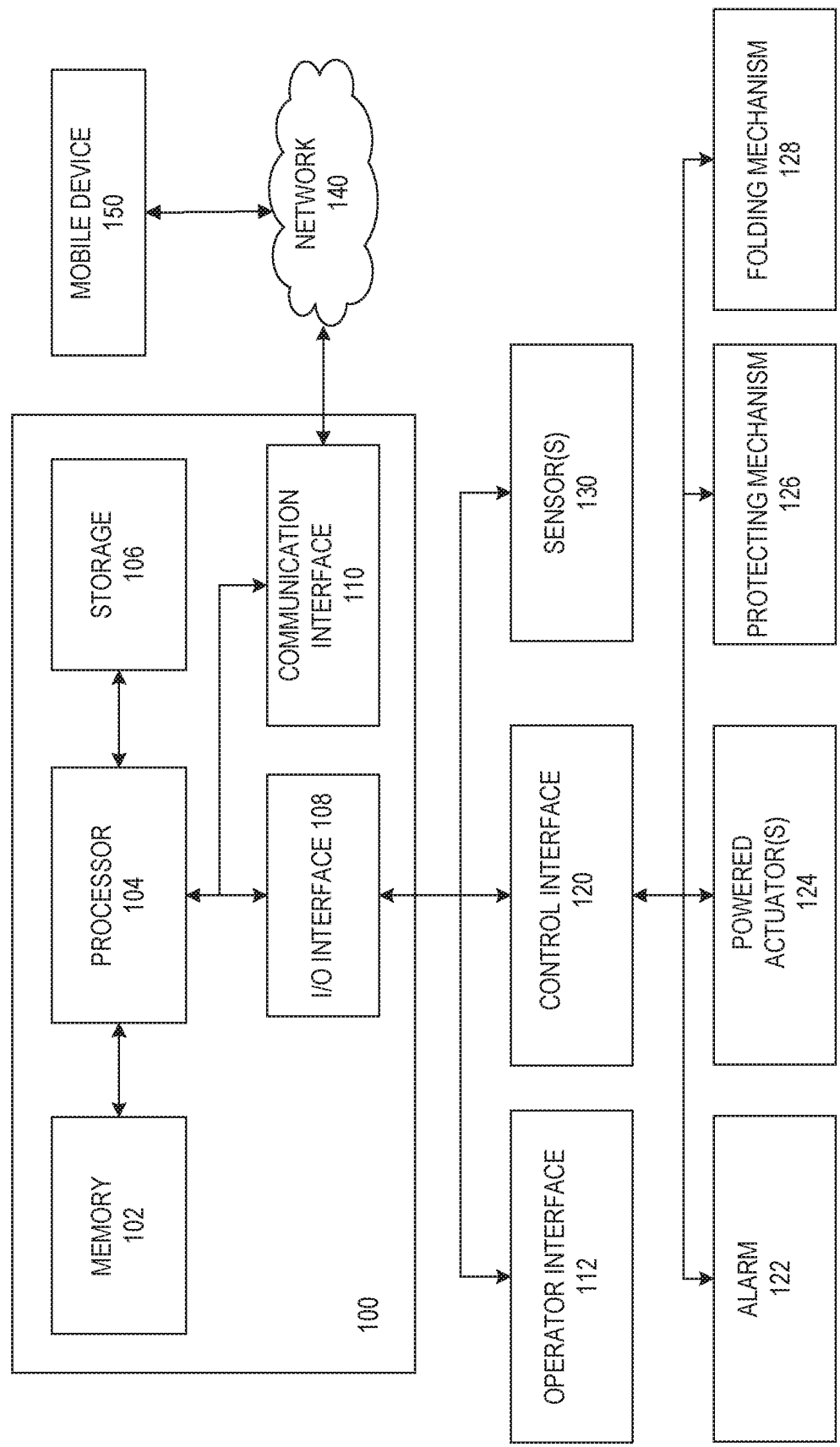
FIG. 1 is a block diagram of an exemplary system for automatically retracting and extending a vehicle steering wheel.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 4:
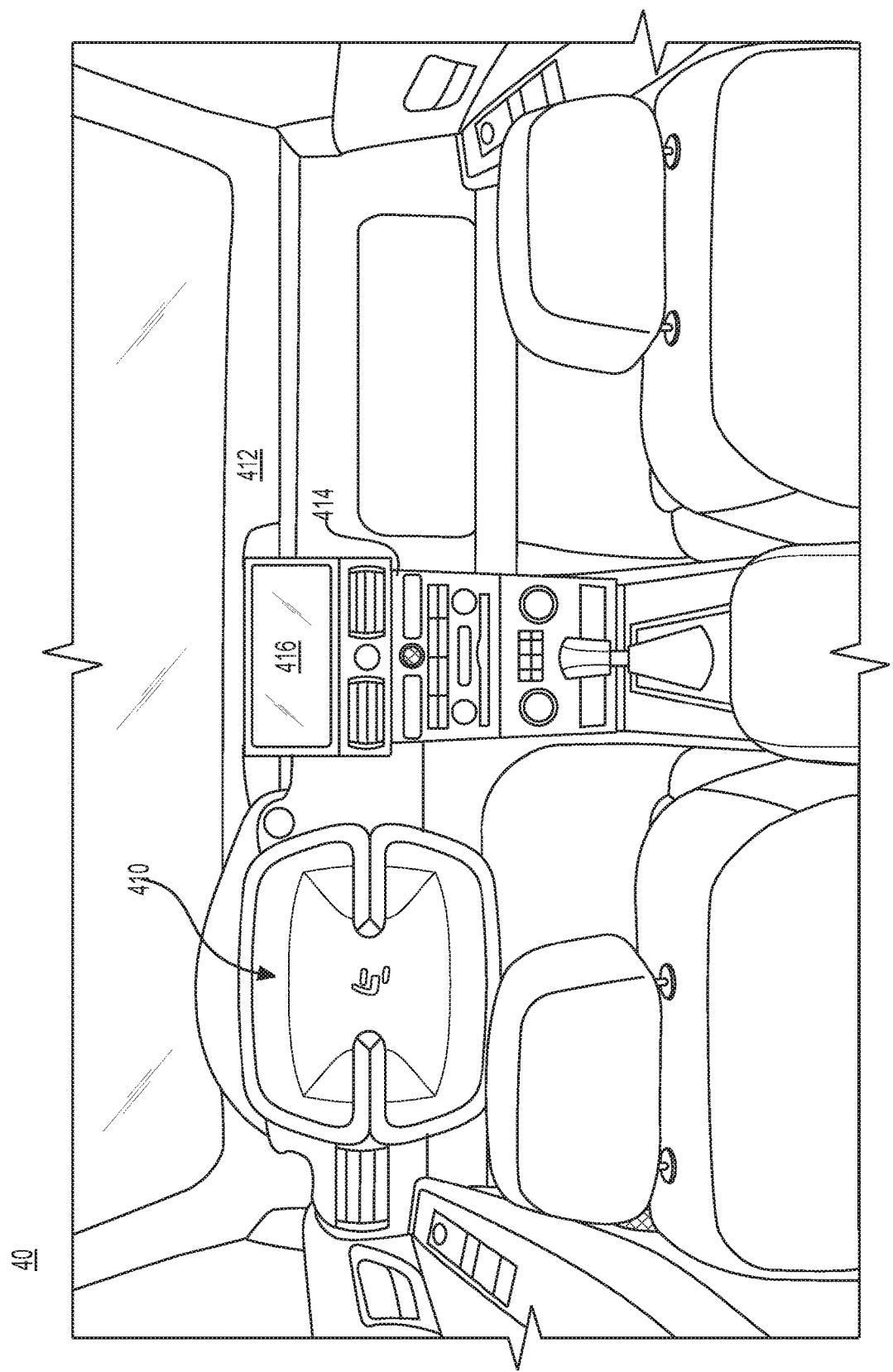
FIG. 4 is a diagrammatic illustration of the instrument panel of an exemplary vehicle configured to implement the exemplary system of FIG. 1.
Figure 5:
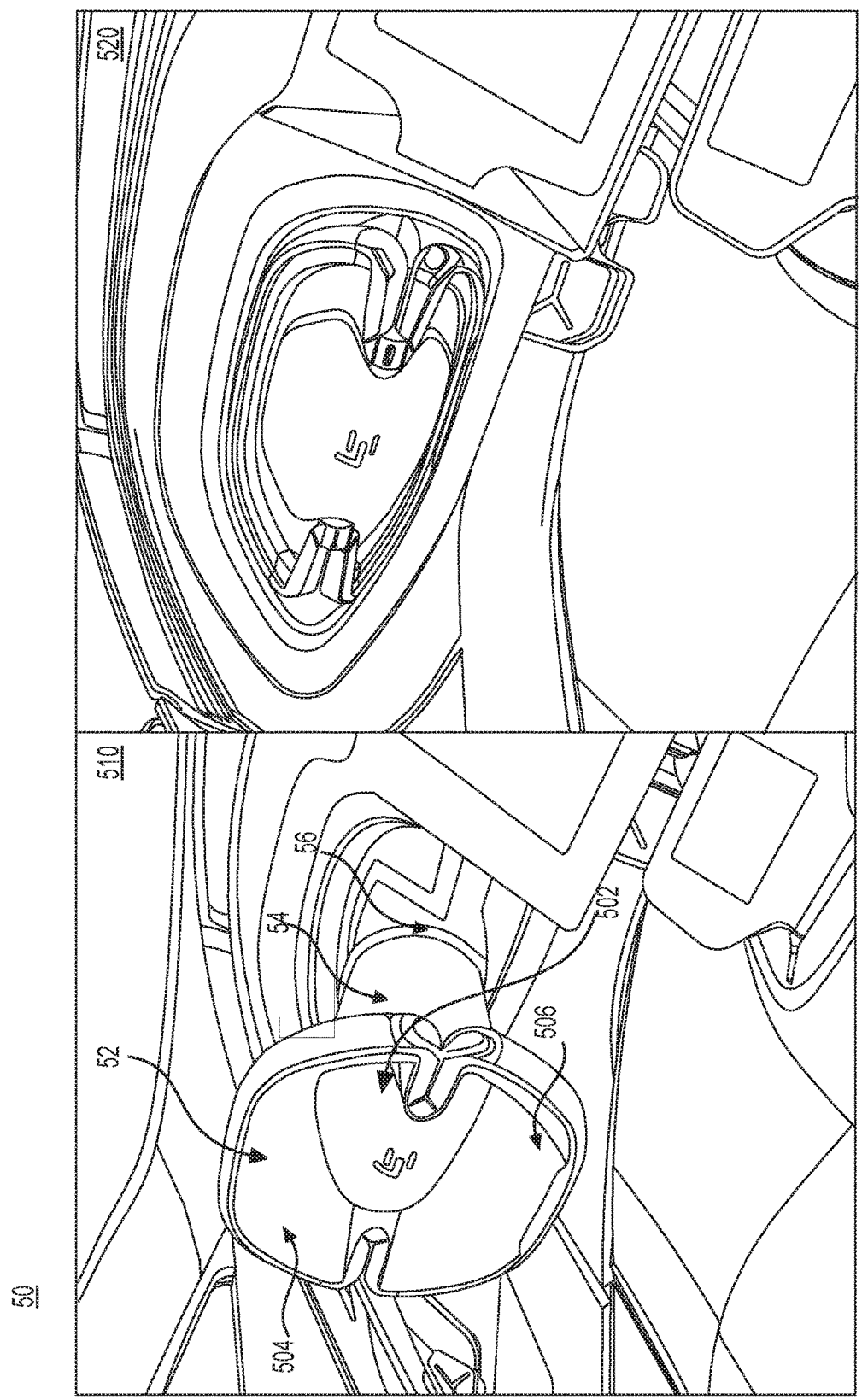
FIG. 5 is a diagrammatic illustration of a fully extended and fully retracted configurations of an exemplary steering wheel configured to implement the exemplary system of FIG. 1.
Figure 6:
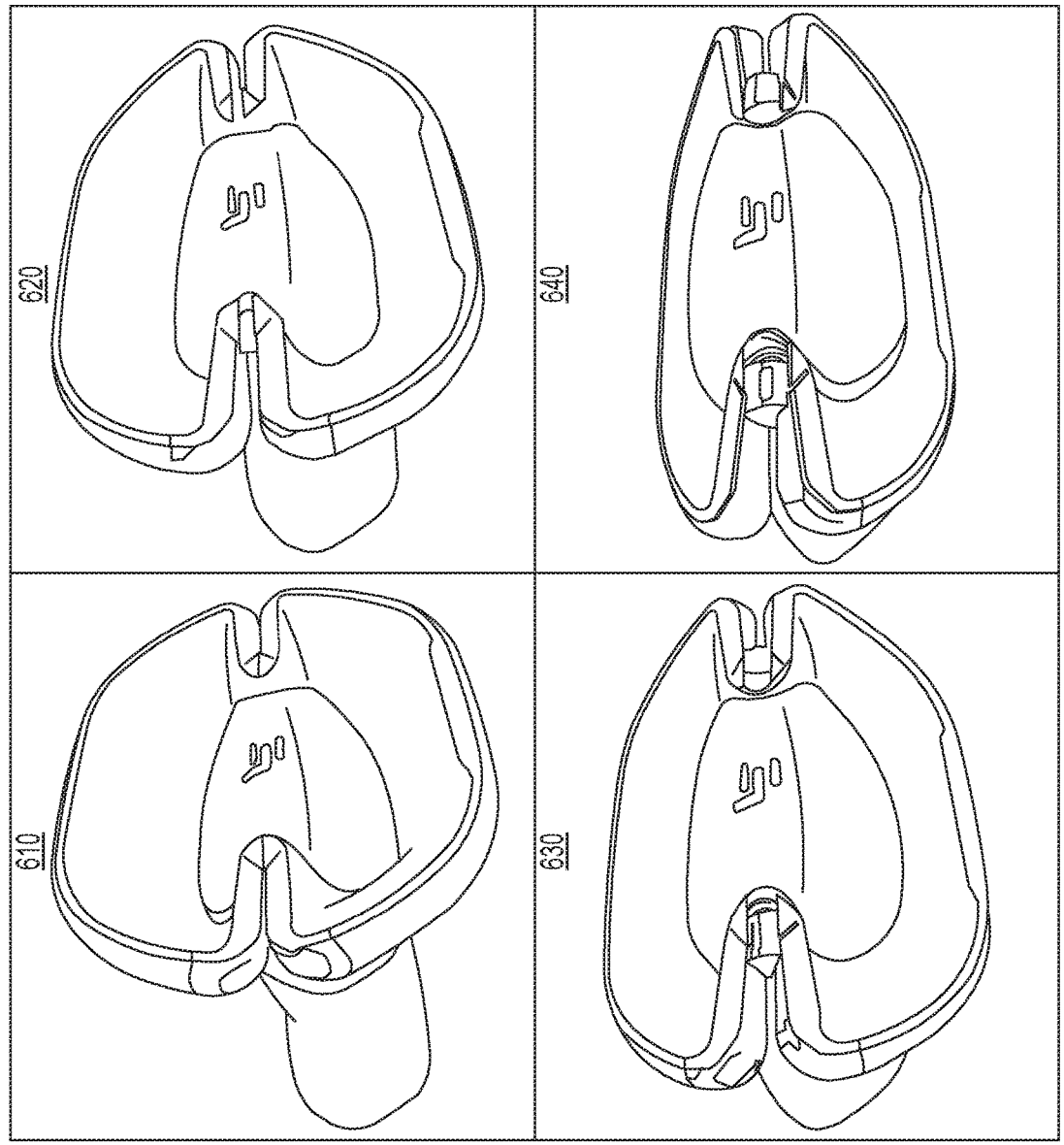
FIG. 6 is a is a diagrammatic illustration of multiple configurations of an exemplary steering wheel configured to implement the exemplary system of FIG. 1.

FIG. 1 is a block diagram of an exemplary system 10 for automatically retracting and extending a vehicle steering wheel. As illustrated in FIG. 1, system 10 may include a controller 100, an operator interface 112, a control interface 120, and one or more sensors 130. System 10 may also include an alarm 122 configured to generate an audio, visual, or display alert under certain circumstances. System 10 may further include one or more actuators 124 configured to move a steering wheel of a vehicle. In some embodiments, actuator(s) 124 may be powered. Actuators 124 may be one of a linear actuator or a motor configured to cause a steering wheel to move to a retracted or extended position determined by controller 100. For example, actuators 124 may be electrically, hydraulically, and/or pneumatically powered. Other types of actuators are contemplated. In some embodiments, system 10 may also include a protecting mechanism 126, configured to pause and/or halt movement of a steering wheel under certain circumstances, and a folding mechanism 128 configured to individually and independently operate one of two halves of a steering wheel (as shown in FIGS. 4-6). Protecting mechanism 126 and folding mechanism 128 are contemplated to operate independently or coordinately.

Controller 100 may have, among other things, a processor 104, memory 102, storage 106, an I/O interface 108, and/or a communication interface 110. At least some of these components of controller 100 may be configured to transfer data and send or receive instructions between or among each other. At least some of these components of controller 100 may be configured to generate symmetric or asymmetric movement of one or both halves of a steering wheel.

Processor 104 may be configured to receive signals from components of system 10 and process the signals to determine one or more conditions of the operations of system 10, including determining an initial and/or final retracted and/or extended position of a steering wheel. Processor 104 may also be configured to generate and transmit a control signal in order to actuate one or more components of system 10. For example, processor 104 may determine and/or instruct a steering wheel to extend or retract, for example, by detecting a position of a steering wheel relative to a desired position of a steering wheel using one or more sensors 130 and instructing powered actuators 124.

In operation, according to some embodiments, processor 104 may execute computer instructions (program codes) stored in memory 102 and/or storage 106, and may perform exemplary functions in accordance with techniques described in this disclosure. Processor 104 may include or be part of one or more processing devices, such as, for example, a microprocessor. Processor 104 may include any type of a single or multi-core processor, a mobile device, a microcontroller, or a central processing unit.

Memory 102 and/or storage 106 may include any appropriate type of storage provided to store any type of information that processor 104 may use for operation. Memory 102 and storage 106 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 102 and/or storage 106 may also be viewed as what is more generally referred to as a "computer program product" having executable computer instructions (program codes) as described herein. Memory 102 and/or storage 106 may be configured to store one or more computer programs that may be executed by processor 104 to perform exemplary functions disclosed in this application. Memory 102 and/or storage 106 may be further configured to store data used by processor 104. For example, memory 102 and/or storage 106 may be configured to store parameters for controlling one or more actuators 124, including, for example, a rate of steering wheel retraction or extension (e.g. contraction or expansion).

Memory 102 and/or storage 106 may also be configured to store the inputs used by processor 104 during states of retraction and/or extension as described herein. For example, memory 102 and/or storage 106 may store fully extended, partially extended, partially collapsed, and fully collapsed steering wheel states (as further described and shown in FIG. 6). Memory 102 and/or storage 106 may also store information acquired by one or more sensors 130, including one or more static or transient road conditions external to a vehicle requiring a manual operation of a steering wheel during autonomous operation. Information acquired by one or more sensors 130 may also include a user activation interior to a vehicle including operator contact with an accelerator (or brake) pedal and/or a steering wheel in order to indicate a desired use of a steering wheel.

I/O interface 108 may be configured to facilitate the communication between controller 100 and other components of system 10. I/O interface 108 may also receive signals from one or more sensors 130, and send the signals to processor 104 for further processing. I/O interface 108 may also receive one or more control signals from processor 104, and send the signals to control interface 120, which may be configured to control the operations of one or more sensors 130, one or more actuators 124, protecting mechanism 126, and folding mechanism 128. In some embodiments, I/O interface 108 may be configured to receive parameters associated with generating a retractable or extendable state of a steering wheel.

Communication interface 110 may be configured to transmit and receive data with, among other devices, one or more mobile devices 150 over a network 140. For example, communication interface 110 may be configured to receive from mobile device 150 a control signal indicative of autonomously extending or retracting a steering wheel. Communication interface 110 may also transmit a control signal to processor 104 for further processing. Network 140 may include WiFi, Bluetooth™, Ethernet, and/or other connections to send and receive information within system 10. Network 140 may include the Internet, a private data network, virtual private network using a public network, wireless cellular network, and/or advanced driver assistance systems (ADAS) and networks that allow for sending and receiving information within system 10. Network 140 may include networking, cloud, and/or backup services (not shown). For example, in some embodiments, a network server (not shown) may include a cloud computing service such as Microsoft Azure™ or Amazon Web Services™. Additional cloud-based wireless access solutions compatible with LTE (4G air-interface for the 3.5 GHz spectrum in the US) are contemplated. In some embodiments, network 140 may include a messaging service, such as, for example, Apple Push Notification Service™, Azure Mobile Services™, or Google Cloud Messaging™.

Operator interface 112 may generate a signal based on the operator's action, and transmit the signal to controller 100 for further processing. Operator interface 112 may be configured to generate a signal for retracting or extending the steering wheel in response to initiation or authentication by an operator. Operator interface 112 may be part of or located on the steering wheel, the control console, the exterior of a vehicle (shown in FIG. 2), the interior of a vehicle (shown in FIG. 3), and/or the instrument panel or dashboard of the vehicle (shown in FIG. 4). Operator interface 112 may sense a force relative to the steering wheel exerted by the operator inside the vehicle, and generate a signal based on the force. For example, operator interface 112 may be a pull handle, a button, a touch pad, a key pad, an imaging sensor, a sound sensor (e.g., microphone), a force sensor, a motion sensor, or a finger/palm scanner, or the like, or a combination thereof.

Operator interface 112 may be configured to receive an input from the operator. Exemplary input may include a touch input, gesture input (e.g., hand waving, etc.), a key stroke, force, sound, speech, face recognition, finger print, hand print, or the like, or a combination thereof. Operator interface 112 may also generate a signal based on the received input and transmit the signal to controller 100 for further processing.

Control interface 120 may be configured to receive a control signal from controller 100 for controlling, among other devices, sensor(s) 130, alarm 122, actuator(s) 124, protecting mechanism 126, and/or folding mechanism 128. Control interface 120 may also be configured to control sensor(s) 130, alarm 122, actuator(s) 124, protecting mechanism 126, and/or folding mechanism 128 based on the control signal.

Sensors 130 may be located on the exterior of the vehicle, the interior of the vehicle, and/or adjacent and/or on the steering wheel. Sensors 130 may include one or more sensors configured to determine a retracted or extended position of the steering wheel. In some embodiments, sensors 130 may include cameras detecting road conditions external to a vehicle and driver or passenger actions internal to a vehicle.

Figure 2:
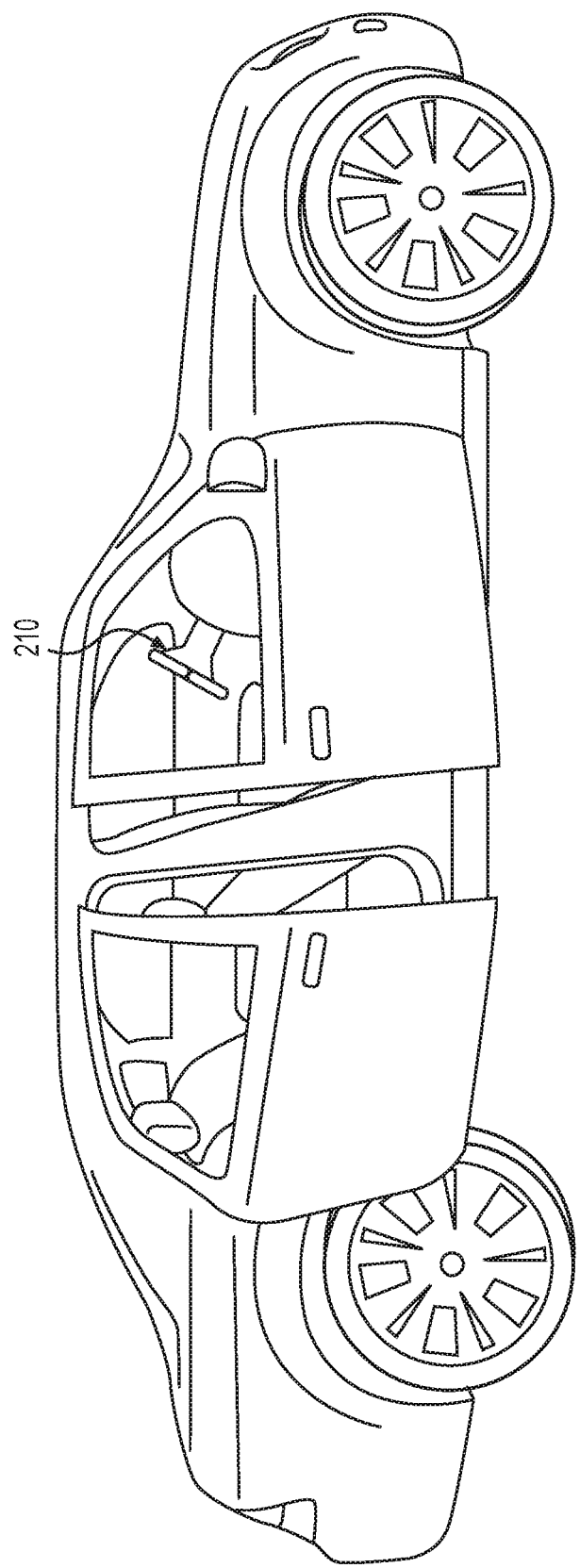
FIG. 2 is a diagrammatic illustration of the exterior of an exemplary vehicle configured to implement the exemplary system of FIG. 1.

FIG. 2 is a diagrammatic illustration of the exterior of an exemplary vehicle 20 configured to implement the exemplary system of FIG. 1. Vehicle 20 may have any body style, such as a sports car, a coupe, a sedan, a pick-up truck, a station wagon, a sports utility vehicle (SUV), a minivan, or a conversion van. Vehicle 20 may be an electric vehicle, a fuel cell vehicle, a hybrid vehicle, or a conventional internal combustion engine vehicle. Vehicle 20 may be configured to be operated by a driver occupying vehicle 20, remotely controlled, and/or autonomously controlled via advanced driver assistance systems (ADAS). As shown in FIG. 2, vehicle 20 includes a steering wheel 210 configured in a fully extended position to be operated by a driver. Steering wheel 210 may retract (not shown) automatically or upon user input. It is further contemplated that vehicle 20 may be on autonomous driving control while steering wheel 210 remains in an extended position.

Figure 3:
FIG. 3 is a diagrammatic illustration of the interior of an exemplary vehicle configured to implement the exemplary system of FIG. 1.

FIG. 3 is a diagrammatic illustration of the interior of an exemplary vehicle 30 configured to implement the exemplary system of FIG. 1. As illustrated in FIG. 3, a vehicle 30 may include a steering wheel 310, dashboard 312 having various components and devices installed thereon, including, for example, a user interface 314 and one or more cameras 316. User interface 314 may interact with I/O interface 108 (as depicted in FIG. 1) to control extension and/or retraction of steering wheel 310. User interface 314 may include a graphical user interface (GUI) and/or alphanumeric buttons to control operation of steering wheel 310 and/or to communicate with external devices such as mobile device 150 through network 140. The one or more cameras 316 may capture and transmit images internal and/or external to vehicle 30 to controller 100. Controller 100 may instruct steering wheel 310 to extend and/or retract accordingly based upon information gleaned from captured images. For example, an image internal to vehicle 30 may indicate one or more passenger(s) not wearing a seatbelt, and accordingly, controller 100 may not allow for extension of steering wheel 310. Similarly, camera 316 may capture an image of an underage driver attempting to gain access to steering wheel 310, and accordingly, controller 100 may not allow for extension of steering wheel 310. Alternatively, controller 100 may extend steering wheel 310. For example, camera 316 may capture an image of pedestrians and/or animals in the path of vehicle 30 unexpectedly crossing the road. In order to avoid an automobile accident, controller 100 may request user intervention, and accordingly, may extend steering wheel 310 so that a user can deviate from autonomous control. An operator may more effectively maneuver steering wheel 310 of a vehicle 30 in order to avoid collisions in unexpected circumstances than autonomous control. It is further contemplated that camera 316 may capture current images of a particular landmark, and processor 102 may compare current images with past images in order to identify any discrepancies. Where discrepancies identifying new unexpected driving conditions are discovered and are determined to require user intervention, controller 100 may also extend steering wheel 310.

As shown in FIG. 3, a driver may operate steering wheel 310 in a fully extended position. The fully extended position may extend in a direction along a longitudinal axis as defined by a steering column extending orthogonal to a dashboard 312 (see also FIG. 2). Steering wheel 310 may extend and/or retract independently of other components operating interior to vehicle 30. Steering wheel 310 may extend and/or retract in parallel with other components operating interior to vehicle 30. For example, it is contemplated that a driver seat may retract or extend in an amount (not shown) corresponding to the retraction or extension of steering wheel 310. This may allow for the creation of additional space enhancing a driver's comfort level when driving.

FIG. 4 is a diagrammatic illustration of the instrument panel of an exemplary vehicle 40 configured to implement the exemplary system of FIG. 1. As illustrated in FIG. 4, vehicle 40 may have an instrument panel and/or dashboard 412 that may house or support a steering wheel 410, an audio system 414, and a screen display 416. Audio system 414 may provide unique audio output and/or sounds consistent with steering wheel 410 retracting and/or steering wheel 410 extending. Audio system 414 may provide another sound when steering wheel 410 stops extending and/or retracting. Various audio tones and/or sounds are contemplated. Similarly, screen display 416 may display various colors, images, and/or flashing icons visible to passengers indicative of steering wheel 410 retracting and/or steering wheel 410 extending. Screen display 416 may display real-time images acquired from camera 316 (as shown in FIG. 3). Various screen displays may be contemplated. As is shown in FIG. 4, steering wheel 410 is extended in a fully extended position, and an airbag (not shown) is fully encapsulated by steering wheel 410. Steering wheel 410 is shown configured on the left front side of dashboard 412 of vehicle 40. It is further contemplated that steering wheel 410 may be configured on the right (or center) front side of dashboard 412 of vehicle 40 to accommodate contemporary vehicle regulations.

FIG. 5 is a diagrammatic illustration of a fully extended and fully retracted configurations of an exemplary steering wheel configured to implement the exemplary system of FIG. 1. In some embodiments, a steering mechanism 50 may include a steering wheel 52, a steering column 54, a steering gear 56, and a tie rod (not shown). For example, steering wheel 52 may be rotated by an operator, which in turn rotates steering column 54. Steering column 54 may be a shaft connecting steering mechanism 50 to steering wheel 52. Steering gear 56 may control the direction of the vehicle, and steering gear 56 may convert the rotational movement of steering column 54 to lateral movement, which turns the wheels of vehicle by movement of the tie rod. Each of the components of steering mechanism 50 may also be remotely controlled and/or perform autonomous functions, such as self-drive, self-park, and self-retrieval, through communication with controller 100. Steering wheel 52 may be configured to detach from a drive train (not shown) to allow for autonomous driving. Steering wheel 52 may comprise any shape including an elliptical and/or circular shape.

A vehicle may further include a plurality of sensors 130 (as depicted in FIG. 1) functionally associated with its components, such as steering mechanism 50. For example, sensors 130 may monitor and record parameters such as speed and acceleration of a vehicle, and function of steering mechanism 50. A vehicle may also include cabin sensors, such as cameras 316 and weight sensors (not shown), configured to acquire parameters of the occupants of cabin. The data from sensors 130 may be aggregated and processed by processor 104 according to software, algorithms, and/or look-up tables to determine conditions of vehicle. For example, cameras 316 may acquire data indicative of the identities of the occupants when an image is processed with image recognition software. The data may also indicate whether predetermined conditions of vehicle are occurring or have occurred, according to algorithms and/or look-up tables. For example, controller 100 may process the data from sensors 130 to determine conditions, such as an unattended child left in vehicle, vehicle being operated recklessly or by a drunken driver, and/or occupants not wearing a seat belt. The data and conditions may be processed by controller 100 to generate appropriate control signals in order to automatically retract a steering wheel to allow for autonomous driving only.

It is also contemplated that various parental permissions may accommodate and allow for predefined algorithmic composition(s) of autonomous and/or user-operated driving based upon an occupant's experience and/or skill level. For example, if it is determined that a driver is inexperienced (e.g. 16 years old), system 10 may allow for extension of steering wheel 52 to allow for user operation only on single lane roads, but may automatically retract steering wheel 52 in favor of autonomous driving if it is determined that the driver is merging onto a highly trafficked interstate and/or highway that operates at high speeds. Various predetermined and predictive compositions of autonomous and/or user-operated driving are contemplated. Furthermore, it is contemplated that system 10 and controller 100 may determine and store user improvement data related to driving ability, and accordingly, it is contemplated that system 10 may sometimes extend a steering wheel more frequently to allow for increased user operation.

As shown in FIG. 5, steering mechanism 50 includes a fully extended or expanded state 510 and a fully retracted or collapsed state 520. Steering mechanism 50 includes a top halve or portion 504 and a bottom halve or portion 506 folding about an airbag 502 from an extended portion 510 to a retracted position 520. Airbag 502 is fully encapsulated within and circumscribed by steering mechanism 50. Various airbag shapes and sizes are contemplated to fit inside steering mechanism 50. The top and bottom halves 504 and 506 are configured to fold about a fixed pivot (not shown) extending along a direction orthogonal to the longitudinal axis as defined by a direction of a steering column. An angle of separation between top and bottom halves in a fully extended position 510 equals 180 degrees. A separation between top and between halves in a fully retracted position may include an acute angle. In both fully extended or expanded state 510 and fully retracted or collapsed state 520, an airbag 502 and its deployment remain unimpeded by folding and unfolding motions of the top and bottom halves 504 and 506 of steering wheel 52.

FIG. 6 is a diagrammatic illustration of multiple configurations of the exemplary steering wheel configured to implement the exemplary system of FIG. 1. As shown in FIG. 6, a steering mechanism 60 includes a fully extended state 610, a partially extended state 620, a partially retracted state 630, and a fully retracted state 640. Steering mechanism 60 includes a top halve or portion and a bottom halve or portion folding about an airbag (not shown) to, from, and between any one of the extended and/or retracted positions. An angle of separation between top and bottom halves in a partially extended position 620 may be an obtuse angle. A separation between top and bottom halves in a partially retracted position 630 may be at an orthogonal angle or an acute angle greater than an acute angle defining a fully retracted position 640. Various and innumerable extended and retracted positions (not shown) and angles are contemplated for both folding and unfolding steering mechanism 60.

Figure 7:
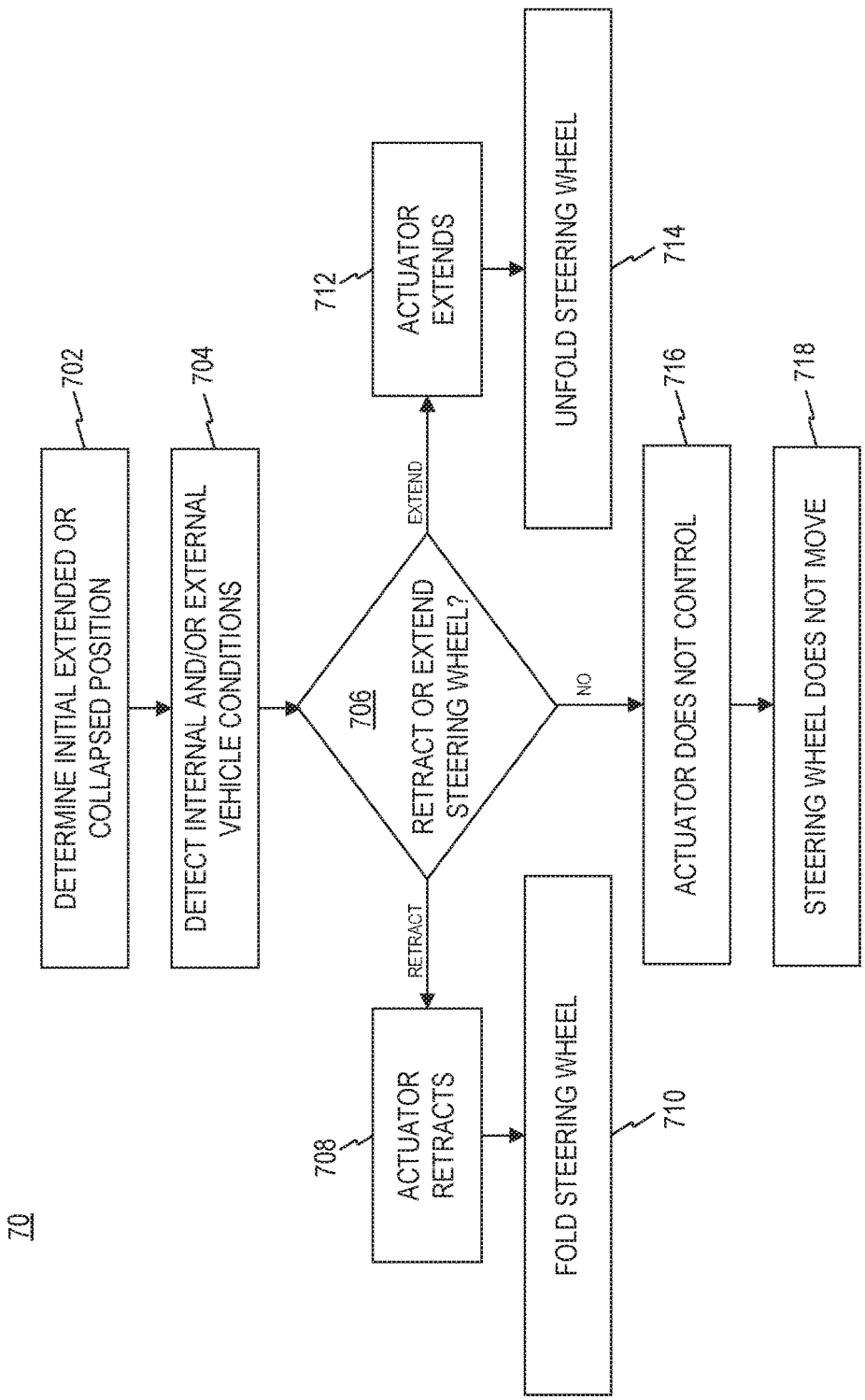
FIG. 7 is a flow chart of an exemplary process performed by the exemplary system of FIG. 1.

FIG. 7 is an exemplary flowchart of a process 70 that may be performed by the exemplary system of FIG. 1. While the exemplary method is described herein as a series of steps, it is to be understood that the order of the steps may vary in other implementations. In particular, non-dependent steps may be performed in any order, or in parallel.

At step 702, process 70 may include a controller 100 determining either an initial extended or initial collapsed position of steering wheel 52. The position may include either a fully or partially extended or collapsed position. The initial position may be configured to extend or retract to multiple final positions. For example, controller 100 may control actuators 124 to extend an initial partially retracted position 630 to a fully extended position 610 (see FIG. 6). Alternatively, controller 100 may control actuators 124 to retract an initial fully extended position 610 to a partially extended position 620. Various initial and final position settings are contemplated in accordance with determinations made by controller 100, and/or are contemplated stored in memory 102 and storage 106.

At step 704, process 70 may include detecting internal and/or external vehicle conditions based upon sensors 130 and/or cameras 316 and/or both operating coordinately. Sensors 130 and/or cameras 316 may detect transient conditions external to a vehicle requiring deviation from autonomous driving, and accordingly, steering wheel may need to be extended to enable operator control. An example of such condition can be when the external camera(s) is incapable of determining the boundary of the road (or lane). Another example can be that the speed sensor detects a current speed of the vehicle outside of a predetermined safe speed range for the vehicle's autonomous mode or above a speed limit of the road on which the vehicle is traveling. Another example can be that the external sensors detecting a hazardous driving condition such as below freezing temperature or heavy precipitation. Another example can be when the vehicle detects that it is at a racetrack based on global positioning system (GPS) data. Another example can be when the sensors (e.g., radar and/or ultrasonic sensors) detect that the vehicle is moving at an unsafe speed towards an object. Another example can be when the sensors detect the approach of an emergency vehicle. Sensors 130 and/or cameras 316 may also detect unsafe conditions internal to a vehicle requiring retraction of a steering wheel to enable autonomous driving.

For example, internal camera(s) or a driver attention monitor system may detect the driver being too tired or distracted from operating the vehicle. As another example, the internal sensors may receive a driver input via an user interface of the vehicle to enter autonomous mode. At step 706, controller 100 may determine whether retracting or extending a steering wheel is required. Based upon a determination of an initial position and detecting conditions, process 70 may include receiving and sending controller signals. Sensors 130 may provide signals to controller 100, and controller 100 may then send the received signals to steering mechanism 50 in response to a determined initial steering wheel position and a desired final steering wheel position based on detected input. A user via I/O interface 108 may also provide a signal or input to controller 100 to move steering wheel 52. The receiving and sending of signals to and from controller 100 based upon a determined position of steering wheel 52 and/or sensors 130 (and user input) may be recorded in memory 102 and storage 106 and/or monitored through network 140.

A determination is made by controller 100 in order to control an actuator to move and/or fold (or unfold) steering wheel 52 as instructed from an initial to a desired final setting. If it is determined that steering wheel 52 requires retracting (the "RETRACT" arrow out of step 706 to step 708), process 70 may proceed to step 708, and actuator(s) 124 may take control to retract steering wheel 52. Accordingly, steering wheel 52 begins folding in a direction toward dashboard 412 at step 710. If it is determined that steering wheel 52 requires extending (the "EXTEND" arrow out of step 706 to step 712), process 70 may proceed to step 712, and actuator(s) 124 may take control to extend steering wheel 52. Accordingly, steering wheel 52 begins unfolding in a direction away from dashboard 412 at step 714. If it is determined that steering wheel 52 requires neither retracting nor extending (the "NO" arrow out of step 706 to step 716), process 70 may proceed to step 716, and actuator(s) 124 may not take control of steering wheel 52. Accordingly, steering wheel 52 may stay in its original extended or collapsed position as initially determined by controller 100, and may not move at step 718. Process 70 may include multiple variations for controlling the retracting and/or extending of steering wheel 52 configured to implement the exemplary system of FIG. 1.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for automatically adjusting a steering wheel of a vehicle, the system comprising:
   a controller configured to generate a control signal for retracting the steering wheel to a collapsed position, the steering wheel including a first half and a second half;
   an actuator configured to collapse the steering wheel in response to the control signal, wherein the actuator is configured to:
      fold the first and second halves of the steering wheel in a direction orthogonal to a direction of a longitudinal axis defined by a steering column; and
      retract the steering wheel along the direction of the longitudinal axis, towards a dashboard;
   wherein the controller is further configured to extend the steering wheel at an increased frequency in response to stored user improvement data relating to driving ability of a user.

2. The system of claim 1, wherein the controller is further configured to generate a second control signal for extending the steering wheel from the collapsed position, and
   wherein the actuator is further configured to:
      extend the steering wheel in the direction of the longitudinal axis, away from the dashboard; and
      unfold the first and second halves of the steering wheel in the direction orthogonal to a direction of a longitudinal axis.

3. The system of claim 1, further comprising at least one of a sensor or a camera configured to detect and transmit information to the controller, wherein the controller is configured to generate the control signal based on the information.

4. The system of claim 3, wherein the information is indicative of an autonomous driving status of the vehicle.

5. The system of claim 1, wherein the actuator is configured to fold the first and second halves of the steering wheel and retract the steering wheel simultaneously.

6. The system of claim 2, wherein the controller is further configured to extend the driver seat in parallel of extending the steering wheel.

7. The system of claim 1, wherein the steering wheel comprises an elliptical shape.

8. The system of claim 1, wherein the actuator is configured to fold the first and second halves about a fixed pivot extending along the direction orthogonal to the longitudinal axis.

9. The system of claim 1, wherein the actuator is configured to fold the first and second halves about an airbag stored in the steering column of the steering wheel.

10. A vehicle, comprising:
a steering wheel including a first half and a second half;
a controller configured to generate a control signal for retracting the steering wheel to a collapsed position;
an actuator configured to collapse the steering wheel in response to the control signal, wherein the actuator is configured to:
fold the first and second halves of the steering wheel in a direction orthogonal to a direction of a longitudinal axis defined by a steering column; and
retract the steering wheel along the direction of the longitudinal axis, towards a dashboard;
wherein the controller is further configured to extend the steering wheel at an increased frequency in response to stored user improvement data relating to driving ability of a user.

11. The vehicle of claim 10, wherein the controller is further configured to generate a second control signal for extending the steering wheel from the collapsed position, and
wherein the actuator is further configured to:
extend the steering wheel in the direction of the longitudinal axis, away from the dashboard; and
unfold the first and second halves of the steering wheel in the direction orthogonal to a direction of a longitudinal axis.

12. The vehicle of claim 10, further comprising at least one of a sensor or a camera configured to detect and transmit information to the controller, wherein the controller is configured to generate the control signal based on the information.

13. The vehicle of claim 12, wherein the information is indicative of an autonomous driving status of the vehicle.

14. The vehicle of claim 10, wherein the actuator is configured to fold the first and second halves of the steering wheel and retract the steering wheel simultaneously.

15. The vehicle of claim 11, wherein the controller is further configured to extend the driver seat in parallel of extending the steering wheel.

16. The vehicle of claim 10, wherein the steering wheel comprises an elliptical shape.

17. The vehicle of claim 10, wherein the actuator is configured to fold the first and second halves about a fixed pivot extending along the direction orthogonal to the longitudinal axis.

18. The vehicle of claim 10, wherein the actuator is configured to fold the first and second halves about an airbag stored in the steering column of the steering wheel.

19. A method for automatically adjusting a steering wheel of a vehicle, the method comprising:
generating, by at least one controller, a control signal for retracting the steering wheel to a collapsed position, the steering wheel including a first half and a second half;
collapsing, by at least one actuator, the steering wheel in response to the control signal, wherein collapsing the steering wheel includes:
folding the first and second halves of the steering wheel in a direction orthogonal to a direction of a longitudinal axis defined by a steering column; and
retracting the steering wheel along the direction of the longitudinal axis, towards a dashboard; and
extending the steering wheel at an increased frequency in response to stored user improvement data relating to driving ability of a user.

20. The method of claim 19, further including:
extending the steering wheel in the direction of the longitudinal axis, away from the dashboard; and
unfolding the first and second halves of the steering wheel in the direction orthogonal to a direction of a longitudinal axis.

* * * * *